(No Model.)

A. J. BARTLETT.
SPRINKLER.

No. 455,151. Patented June 30, 1891.

WITNESSES:
J. A. Criswell
C. Sedgwick

INVENTOR:
A. J. Bartlett
BY Munn & Co.
ATTORNEYS

United States Patent Office.

ALPHEUS J. BARTLETT, OF POMONA, CALIFORNIA.

SPRINKLER.

SPECIFICATION forming part of Letters Patent No. 455,151, dated June 30, 1891.

Application filed December 10, 1890. Serial No. 374,125. (No model.)

*To all whom it may concern:*

Be it known that I, ALPHEUS J. BARTLETT, of Pomona, in the county of Los Angeles and State of California, have invented a new and useful Improvement in Sprinklers, of which the following is a full, clear, and exact description.

My invention relates to an improved sprinkler of that class known as "rotary lawn-sprinklers," and has for its object to provide a device of simple, durable, and economic construction, and also to provide a means whereby the rotary section of the device will revolve upon a water-bearing, thereby reducing the friction to a minimum; and the invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1:
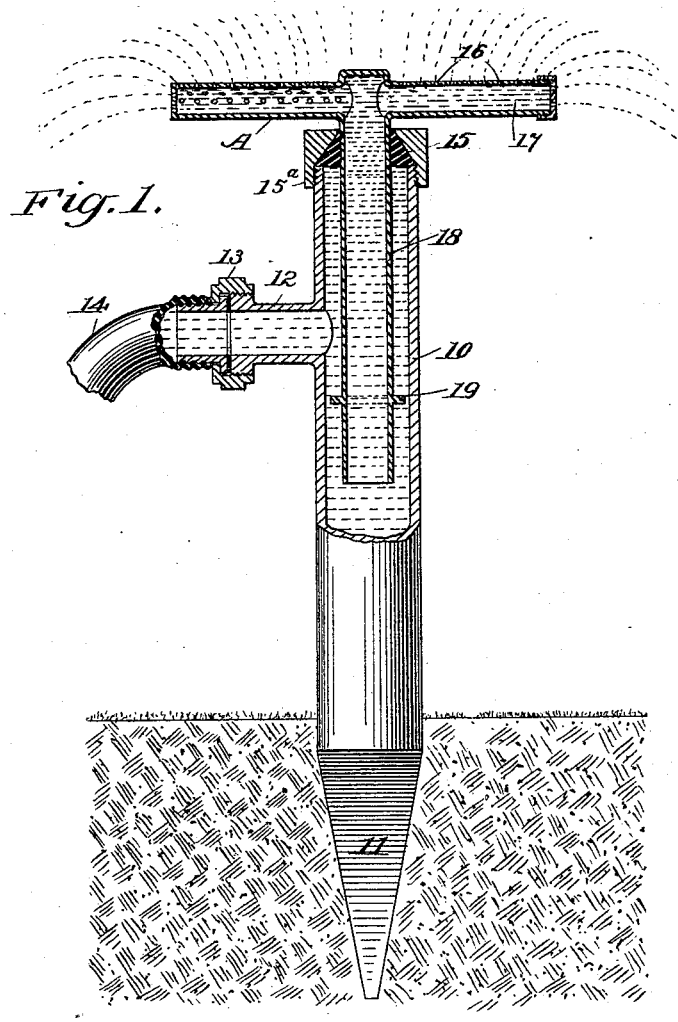
Figure 2:
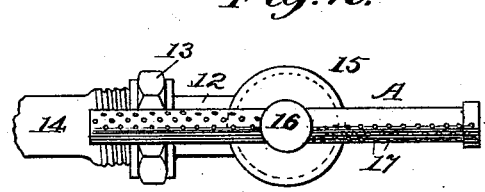

Figure 1 is a partial side elevation and vertical sectional view of the device, and Fig. 2 is a plan view thereof.

The body 10 of the device preferably consists of a tubular casing, the lower end 11 whereof is pointed and the upper end open. The body is also provided at one side with a branch 12, extending therefrom at a right angle, which branch is ordinarily exteriorly threaded to receive the coupling 13 of a hose 14.

At the upper end of the tubular body a packing 15 is located having an essentially conical exterior. The packing rests upon the top of the body and is held in place by an apertured cap $15^a$, screwed upon the body and provided with a conical inner surface adapted to fit neatly upon the packing. The pressure of the water contained in the body will cause a tight joint to be formed between the cap and packing, and the material from which the packing is made may be rubber, leather, or any equivalent thereof.

In connection with the body a sprinkling-tube A is employed. The said sprinkling-tube is T-shaped, and may be made in one piece or in any desired number of sections. The sprinkling-tube, as stated, is T-shaped in general contour, the horizontal member 16 thereof being provided with a number of apertures 17 in its sides and ends. The vertical member 18 of the tube extends downward within the tubular body through an opening in the packing 15, the said opening being of such a diameter that the packing will fit snugly to the said member, as illustrated in Fig. 1.

The vertical member of the sprinkling-tube is provided, preferably, at a point between its center and lower end with an annular exterior collar 19, the said collar being of less diameter than the interior diameter of the body, whereby a space is created between the collar and the body, as shown in Fig. 1. The lower end of the sprinkling-tube is open.

In operation the water enters through the branch 12 of the body, fills the said body, and, passing upward through the vertical member of the sprinkling-tube, enters the horizontal member thereof, and in passing out through the apertures of the latter member forces the tube to revolve.

It will be observed that the sprinkling-tube has no metallic support within the body, the support for the tube consisting only of a water cushion or bearing, and the said cushion is formed by the pressure of water above the collar being equal to that below it. Thus the sprinkling-tube is enabled to revolve with a minimum degree of friction.

Were there no apertures 17, the pressure on the pipe would be equal to that on the end cross-section of the member 18 of the sprinkling-tube, which would force the sprinkler upward until stopped by contact of the collar 19 with the packing 15; but as the pressure of the water is relieved by the apertures 17 the balance of pressure on the pipe is sufficient to counterbalance the weight of the sprinkler A and hold it suspended in a water-cushion.

Having thus described my invention, I claim as new and desire to secure by Letters Patent—

1. As an improved article of manufacture, a sprinkler consisting of a tubular body provided with a packing at its upper end, and a sprinkling-tube one member whereof passes downward through the packing into the body, the said member being provided with an exterior collar adapted to turn upon a water-cushion, as and for the purpose specified.

2. In a sprinkler, the combination, with a tubular body provided with a branch and a packing located at the top of the body, of a T-shaped sprinkling-tube, the vertical member whereof extends through the packing into the body and is provided with an exterior collar of less diameter than the interior of the body and adapted to turn upon a water-cushion or bearing, substantially as shown and described.

3. In a sprinkler, the combination, with a tubular body provided with a reduced lower extremity, an open upper end and a side branch, of a cap-packing closing the upper end of the body, which packing extends upward within the cap and is provided with a central opening, and a sprinkling-tube comprising a horizontal and a vertical member, the vertical member of which extends through the packing into the body and is provided with an exterior collar of less diameter than the interior diameter of the body, the said collar, together with the lower end of the vertical member of the sprinkling-tube, being adapted to turn upon a water cushion or bearing, as and for the purpose specified.

ALPHEUS J. BARTLETT.

Witnesses:
FRANCISCO D. JOY,
C. C. JOHNSON.